Figure 1:
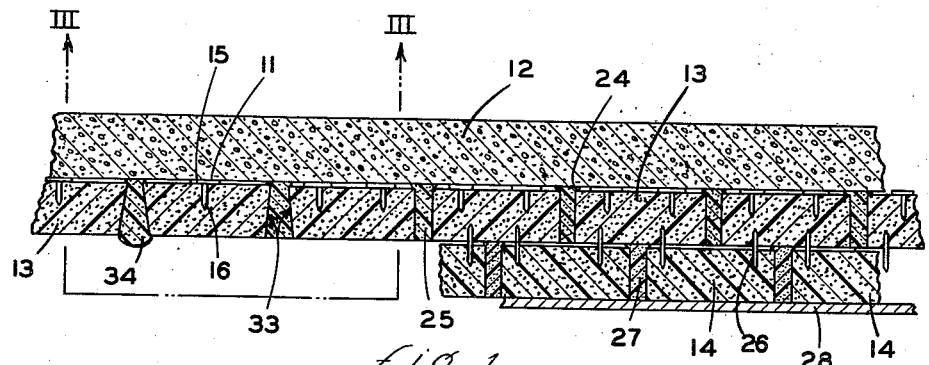

Oct. 15, 1963

P. C. FISH 3,106,751

INSULATED WALL STRUCTURE

Filed Dec. 16, 1955

INVENTOR.
PERCY C. FISH
BY Lindley E. Mills

United States Patent Office 3,106,751
Patented Oct. 15, 1963

3,106,751
INSULATED WALL STRUCTURE
Percy C. Fish, Kalamazoo, Mich., assignor to The Dow Chemical Company, Midland, Mich., a corporation of Delaware
Filed Dec. 16, 1955, Ser. No. 553,665
13 Claims. (Cl. 20—4)

This invention relates to a method for forming an insulated wall structure and to the so-formed structure.

The advances in the refrigerating and air conditioning arts during the last several years have increased enormously the demand for materials and methods for insulating the walls of refrigerated rooms, dwellings and other structures against the flow of heat through the walls. Among the more recently available insulating materials which have been employed are the foamed or expanded resins, such as foamed polystyrene, foamed alkyd and polyester resins and the like. These substances are generally characterized by a low density, a low heat transfer coefficient and other desirable properties. Foamed polystyrene, in particular, has found wide usage as a heat insulator in the applications mentioned and the present invention will be described with particular reference thereto, although it is to be understood that other suitable foamed resinous heat insulating materials can also be employed when desired.

Various means have heretofore been utilized for insulating a preformed wall body structure with foamed polystyrene. The polystyrene is ordinarily used as preformed blocks or slabs cut from a mass of the foam which are secured in a substantially continuous layer to a surface of the wall body which is to be insulated. In some instances the polystyrene is secured to the surface of the wall body by coating the wall or one surface of the polystyrene blocks with a suitable adhesive. This method, however, is time consuming and many of the adhesives which are available at a reasonable cost either have a solvent action on the polystyrene or do not give too satisfactory a bond between the polystyrene and the wall surface, which may be of concrete, wood, metal, plaster or of any other of the usual building materials. Furthermore, for best results a certain amount of pressure between the polystyrene and the wall surface while the adhesive is setting is advisable, especially when the surface is rough and uneven, and this, of course, renders the method unwieldy and costly. In addition, certain substances sometimes used for adhering the blocks to the wall surface, such as asphalt and cement preparations, have insulating values much lower than those of polystyrene and other foamed resins and contribute little, if any, insulating value to the final structure. When such substances are used between the blocks to secure them to one another, the substance forms a path through the insulating covering of greater heat conductivity than the insulation itself. Various mechanical means have been suggested for securing slabs of polystyrene to a wall surface but these are generally unsatisfactory because of the low density and poor holding characteristics of the polystyrene as ordinarily used. Metal fasteners have been used which extend through the polystyrene, but these form heat conducting paths through the insulation and, in addition to lowering the over-all insulating efficiency of the structure significantly, furnish regions of moisture condensation on the warm side of the wall.

In carrying out these and similar methods as heretofore practiced, the separate blocks or slabs of polystyrene which are used are ordinarily bonded to one another along their facing end and side surfaces to form a unitary insulating sheet over the wall surface. This bonding operation is generally carried out by coating the end and side surfaces of the blocks with an adhesive as they are laid up and pressing them firmly together so that the surfaces are in as intimate face-to-face contact as possible. The adhesive is then allowed to set or harden. It is apparent that, regardless of the method used for securing the insulating elements to the wall, the bonding of the separate insulating elements to one another is essentially a hand operation which increases greatly the over-all cost of the insulated wall structure as well as the time consumed in making it. It is equally apparent that any method which would facilitate the formation of such an insulated wall structure, as well as the structure itself, would be of great value.

It is, therefore, an object of the present invention to provide a method for applying preformed foamed resinous insulating elements to the surface of a preformed wall body to form an insulated wall structure.

An additional object is to provide a method for bonding a plurality of foamed resinous insulating elements to a wall surface and, simultaneously, for bonding adjacent elements to one another.

An additional object is to provide a method for insulating a wall body with preformed insulating elements of foamed polystyrene whereby the elements are bonded firmly to the wall surface and to one another to form a unitary insulating wall covering as an integral part of the insulated wall structure.

An additional object is to provide a method for bonding a plurality of foamed resinous insulating elements to a wall surface and to one another whereby the locating of the elements in face-to-face contact with one another is avoided.

An additional object is to provide an insulating wall structure characterized by a high degree of adherence of the insulating elements to one another and to the wall body.

An additional object is to provide an insulating wall structure free of mechanical fastening devices of metal or other materials which extend through the insulating material.

Other objects will be apparent as the description proceeds.

According to the present invention the above and related objects are accomplished readily and economically by first supporting a plurality of preformed insulating elements, usually in the form of blocks or slabs of suitable dimensions, on the surface of a wall body which is to be insulated. The wall body may be of concrete, stone, brick, plaster, wood, metal or of other conventional structural materials. The blocks are supported on the wall body surface in any manner, temporary or otherwise, which will retain them in their locations until the insulating operation is complete but which need not be of such a nature as to form any permanent bond between the surface and the block. In the case of floors, the blocks can merely be arranged on the floor and, if desired, held in place by suitable weights, e.g. by planks laid across them, to guard against their accidental displacement. The insulating elements are arranged so that the facing end and side surfaces of adjacent elements are separated from one another by a suitable distance, e.g. by a distance of approximately one-fourth to three-fourths inch. When so located, a section of the surface of the wall body which is being insulated is exposed at the bottom of the channel or trench separating each element from each adjacent element.

A layer of a foam-forming polymerizable resinous adhesive composition is then distributed, e.g. by spraying, by brushing, by means of a caulking gun or in any other conventient manner, on the facing surfaces of the adjacent insulating elements and on the exposed section of the surface of the wall body. The foam-forming, polymerizable adhesive composition is then caused to foam and harden or set, whereupon it expands to fill the entire space between the facing surfaces of the insulating elements with a hardened foam, thus bonding them firmly together. At the same time the foamed adhesive becomes securely bonded to the surface of the wall body along the bottom of the channel between the insulating elements. In this way each preformed insulating element is bonded around its edges securely and permanently to the wall body surface and adjacent elements are bonded firmly to one another to form a unitary insulating covering for the wall body which is of high insulating value throughout. The bonding of the insulating elements to the wall body surface can be independent of metal or other mechanical fastening means which furnish a path of relatively high heat conductively through the insulating elements or between them. The size of the insulating elements which can be employed is limited principally by handling considerations and the strength of the elements themselves, it being possible to use much larger elements when following the above procedure than is generally possible using hitherto known procedures. The attendant saving in labor cost is apparent.

Figure 2:
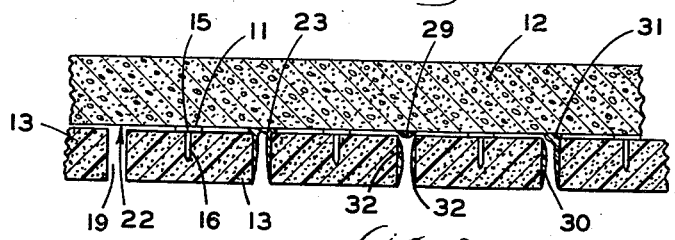
Figure 3:
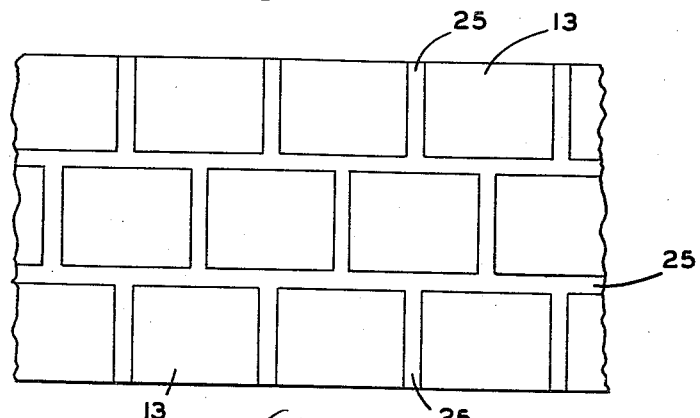
Figures 4, 5:
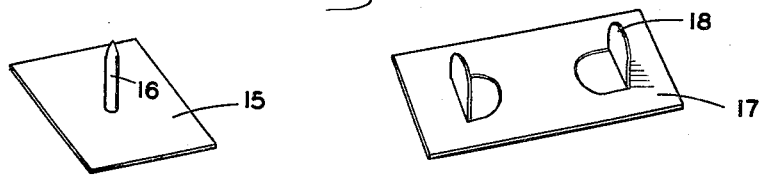

The invention can be understood readily by reference to the accompanying drawing wherein, in the interest of clarity, certain features are shown on a somewhat exaggerated scale and wherein:

FIGURE 1 is an horizontal sectional view of an insulated wall structure embodying features of the invention, FIGURE 2 is an horizontal sectional elevation showing an intermediate stage in the construction of an insulated wall structure according to one modification of the process of the invention, FIGURE 3 is a side elevation taken along the line III—III of FIGURE 1, FIGURE 4 is an oblique elevation of a supporting element useful in carrying out the process of the invention, and FIGURE 5 is an oblique elevation of another supporting element useful in carrying out the process of the invention.

Referring to FIGURE 1, there is shown a conventional wall body structure 12 which is illustrated as being of concrete but which can, if desired, be of wood, plaster, metal, stone, brick or of any other single or composite conventional construction generally used for such purposes. A plurality of insulating blocks 13 are supported on the surface of the wall body 12 in any convenient temporary or permanent fashion which will retain them in position during the rest of the process. In practice, the supporting means employed is generally, as a matter of convenience and cost, of such a nature that the blocks at this stage of the process are not secured permanently to the wall body surface although such procedures can, of course, be employed if desired. However, the permanent securing of the insulating elements to the wall body surface according to the present invention does not depend upon such procedures, as will be apparent as the description proceeds.

One convenient means for supporting the insulating elements 13 to the surfaces of vertical and overhead wall bodies comprises the use of a supporting element similar to that shown in FIGURE 4 which can be made of wood, laminated paper, synthetic resins or the like or of metal, if desired. The device of FIGURE 4 comprises a flat base 15 of suitable dimensions, to one side of which is secured a pin or peg 16 which is much shorter than the thickness of the insulating elements 13. In use, the face of the base 15 opposite the peg 16 is coated with a suitable adhesive, such as hot asphalt or the like, which need have only a weak, temporary adhesive effect, and the coated surface is then pressed against the surface of the wall body 12 to cause it to adhere thereto, as in FIGURES 1 and 2, by the cooling and hardening of the asphalt, the asphalt layer being indicated by the reference numeral 11. Such supporting elements can be located on the wall body surface in suitable places although they do not need to be located accurately, as will be apparent later on.

Suitably dimensioned preformed blocks or slabs of foamed polystyrene 13, or of other suitable foamed resinous insulating material, are then pressed onto the pegs 16, the pegs penetrating the blocks and supporting them on the wall body surface as illustrated in FIGURE 2. The device of FIGURE 5 comprising a base 17 of a suitable metal or resinous sheet material having one or more partially punched out sections 18 turned along their uncut edges at substantially right angles to the base 17 illustrates another convenient means for supporting the insulating elements 13 on the surface of a wall body 12. The device of FIGURE 5 has the added advantage, as compared with the device of FIGURE 4, that it supports the blocks at a plurality of points and thus eliminates any tendency of a block to rotate about its support before the process is completed. The same effect can, of course, be obtained using two or more of the devices of FIGURE 4 for each block or insulating element.

Other suitable or conventional means can, of course, be employed for supporting the insulating elements 13 on the surface of the wall body 12. In the case of wall bodies of wood, finishing nails of suitable length can be driven part way into the wall and the insulating elements impaled on these. If desired, an adhesive can be applied directly, in isolated spots or continuously, over one surface of the insulating elements 13 and this surface then pressed directly against the surface of the wall body 12. The use of a device similar to that of FIGURE 4 or 5 is, however, advantageous in that it provides for spacing the insulating elements at a slight distance from the surface of the wall body, the advantage of which will be apparent later on. Also, the use of a supporting member, such as that of FIGURE 5, is advantageous when the surface of the wall body is somewhat irregular and uneven, as in the case of cement blocks, rough concrete and the like. By locating the supporting members between any such projections on the wall body surface, the insulating elements themselves extend over the high points of the wall body surface and the outer surfaces of the insulating elements lie in essentially the same plane, thus furnishing an insulated structure with a smooth outer surface. As mentioned previously, the insulating elements 13 are supported on the wall body surface 12 so that each element is separated from each adjacent element, as at 19 of FIGURE 2, by a suitable distance forming a channel or groove between the elements at the bottom of which a section 22 of the surface of the wall body 12 is exposed.

Following the supporting of the insulating elements 13 on the surface of the wall body 12 as just described, a suitable foam-forming and polymerizable resinous adhesive composition, which will be described later, is deposited on the facing surfaces of the insulating elements 13 forming the channels 19 and, insofar as is possible, on the exposed sections 22 of the surface of the wall body at the bottom of the channels 19. The foam-forming resinous adhesive composition can be applied in any suitable manner, e.g. by spraying or brushing if the composition is of suitably low viscosity, or by means of a caulking gun if it is of sufficiently high viscosity. Generally speaking, it is advisable to coat the facing surfaces of the insulating elements 13 and exposed sections 22 of the surface of the wall body 12 as completely as conveniently possible with the adhesive composition, although it is not essential that this be done with great care. In certain instances, depending largely upon the distance separating the wall body surface and the adjacent edges of the facing surfaces of the insulating members 13, and also upon the viscosity of the adhesive employed, the adhesive will form a continuous coating extending over one of the facing surfaces, across the exposed section of the wall body surface and over the other facing surface of the other insulating element as illustrated at 23 of FIGURE 2. In other instances, depending again upon the same factors, the coating of adhesive may not be continuous but may be deposited as separate masses, 29 and 32 or 30 and 31 of FIGURE 2, on the surfaces mentioned.

In any event, the deposited foam-forming resinous adhesive composition is then caused to foam and harden or set. These properties are usually inherent in the composition employed, as will be explained later, and it suffices merely to allow the foam-forming and setting process to occur under autogenous temperature and pressure. Due to the foaming and the increase in volume of the adhesive composition, the channels 19 between the insulating elements become entirely filled with the foamed mass. Because of the cross-linking polymerization which occurs along with the foaming, the mass hardens as it foams, the final result being that the channels become filled with a substantially rigid cellular insulating mass of resin, 25 of FIGURE 1, which is bonded firmly to each of the surfaces of the insulating members 13 and also to the sections 22 of the surface of the wall body 12 originally exposed at the bottom of the channels 19. In this way all of the insulating elements 13 are connected firmly together through the body of insulating foamed resin between them and the entire insulating layer is secured firmly to the wall body surfaces around the edges of each insulating element. The joints between the insulating elements are flexible and any tendency for the insulation to crack or for the seams to open with change in temperature is avoided. In general, the regions of the joints are stronger than the insulating elements themselves. The insulated wall structure thus formed is devoid of any heat-conducting paths through the insulating layer because the foamed resinous adhesive is itself an excellent insulator and because of the absence of metal or other fastening devices extending through the insulating layer.

It is apparent that the process described and the insulated wall structure produced thereby are susceptible to considerable variation. Thus, the insulating elements themselves can be of any size and configuration desired and corresponding decorative effects of the outer insulated surface of the structure can be obtained. The insulating elements 13 can be of rectangular shape and placed with staggered joints much in the nature of the way a brick wall is generally built up to give an effect resembling that of FIGURE 3. On the other hand, elongated insulating elements can be positioned side by side so as to extend vertically on side walls and a paneling effect obtained. Insulating elements made from colored foamed resinous compositions can also be utilized and the adhesive composition employed can be the same or a different color, as desired. Pleasing decorative effects can also be obtained in other ways.

As has been mentioned previously, it is frequently desirable that the insulating elements 13 be supported at a little distance, e.g. approximately 1/16 to 1/8 inch, from the surface of the wall body 12. This is of some advantage in that it allows the adhesive, prior to and during the foaming stage, to spread for a short distance along the surface of the wall body 12 under the edges of the insulating elements 13, as indicated at 24 of FIGURE 1. This furnishes a somewhat greater bonding area with the surface of the wall body 12. However, it is generally advisable to carry out the process so that there is not too great a penetration of the unfoamed adhesive into the space between the insulating elements 13 and the surface of the wall body 12. If this occurs, there is some possibility that when the adhesive foams it will force the insulating elements away from the surface of the wall body 12 and thus lead to an uneven outer surface of the insulation layer.

It is also advisable in certain instances to bevel the facing surfaces of the insulating elements 13 to a certain extent, as shown at 33 of FIGURE 1, so that the channel 19 separating adjoining elements is narrower at the bottom adjacent the wall body 12 than it is at the top. This allows for freer increase of the volume of the adhesive during the foaming process and decreases markedly any tendency which the expanding adhesive may have to drag the insulating elements along with it away from the wall body 12. It is generally advisable to employ sufficient of the foam-forming resinous adhesive composition to fill the channels or spaces between the adjacent insulating elements 13 completely during the foaming process. As generally carried out this leads to the protuberance of an excess of the foamed hardened adhesive along most of the joints between adjacent insulating elements when the process is complete and the adhesive has completely hardened, as illustrated at 34 of FIGURE 1. Such excess can be removed easily and rapidly with a sharp knife or with a sander to leave an even surface over the region of the joints and thus over the entire exposed area of the insulating layer.

Although it is generally suitable to apply a single layer of insulating elements of adequate thickness to a wall surface to give the desired insulating effect, the insulation can, if desired, be built up in multiple layers as illustrated in one part of FIGURE 1. To this end, a series of pegs 26, preferably pointed on each end, can be thrust into the layer of insulating elements already in place after the adhesive has been applied and allowed to foam and harden and a second layer of insulating elements 14 can then be impaled on the projecting ends of the pegs 26 and pressed to within a desired distance from the surface of the first layer of insulating elements 13. Additional quantities of the foam-forming resinous adhesive composition are then deposited, e.g. by spraying, brushing or the like, in the channels between the facing surfaces of the thus supported second layer of insulating elements 14 in a manner entirely analogous to that described for adhering the elements of the first layer to one another and to the wall surface. Upon causing the adhesive to foam and set as before, the insulating elements of the second layer becomes bonded firmly to one another through the foamed set adhesive 27 which fills the channels between them and which it also bonded to the exposed surface of the first layer of insulating elements. In this way the insulating layer can be built up step-wise, if desired, to any suitable thickness.

Eventually the surface of the insulating layer can be covered in any desired or necessary way with a suitable protective or decorative covering 28 of FIGURE 1, such as a sheet of plywood, asbestos board and the like. Such covering sheets can be applied in conventional manner or can be omitted entirely, if desired.

As indicated previously, substantially any preformed expanded or foamed resinous composition can be employed as the insulating elements in forming the insulated wall structure of the invention. Such products are conventional and well known in the art and include, among others, foamed phenolic resins, foamed polystyrene type resins, foamed vinyl resins, foamed urea-formaldehyde resins, cellular cellulose acetate, foamed natural and synthetic rubbers and many others. In certain instances inorganic insulating elements, such as cellular concrete, microporite and the like, can also be used with advantage. The available insulating materials vary considerably in density, strength and rigidity or flexibility as well as in heat conducting properties. Generally speaking, the insulating material used in any particular instance will be chosen with regard to these properties and to its cost and the particular degree of insulation desired, it being understood that the invention is not limited with respect to the degree of insulation effected or the composition or properties of the particular preformed insulating elements employed.

The foam-forming polymerizable resinous adhesive composition employed is selected, in part, on the basis of its ability to adhere to the surface of the insulating elements employed and to the particular wall body involved. The adhesive should, of course, foam and set to a suitably rigid cellular composition, preferably having a degree of rigidity roughly comparable to that of the insulating elements employed, without heating and should preferably not require too long a time for this to occur. Foam-forming polymerizable compositions suitable for use in which the foaming and polymerization are substantially complete in from one to several hours or less are available. Such compositions may be based on phenolic, vinyl, alkyd, polyester and other resinous compositions. Inasmuch as it is desirable that foaming occur relatively rapidly at atmospheric temperature, it is usually necessary to perform the final mixing of the composition immediately prior to its use. Various mechanical "guns" and other devices are available for mixing a foaming agent or catalyst and the resinous composition and for simultaneously applying the foam-forming adhesive composition thus formed on the face surfaces of the insulating elements and on the exposed sections of the surface of the wall body.

The preferred foaming agent is a bifunctional compound which will react at ordinary room temperature with functional radicals contained in the resinous composition to liberate a gas and also a cross-link the resulting foam as a result of copolymerization into a structure of suitable rigidity. Thus the aromatic diisocyanates, such as toluene diisocyanate, will react with carboxyl radicals or hydroxyl radicals of resinous compositions, such as those contained in the alkyd and polyester resins, or with water included in or added to a resinous composition, to liberate carbon dioxide which causes the composition to foam. At the same time the reaction converts the originally viscous liquid resinous composition into a rigid composition by reason of its cross-linking polymerizing action. The net result of using such a mixture is that the channels between the insulating elements become completely filled with the foamed, hardened resinous composition, which effects the bonding of the elements to one another and to the wall body surface and which is also an efficient heat insulator. The invention, however, is not limited to the use of any particular foam-forming resinous composition as the adhesive provided only that it embodies the desired adhesive, foam-forming and setting characteristics under atmospheric conditions.

I claim:

1. The method of forming an insulated wall structure comprising:
   providing a supporting member which comprises a base plate and a supporting element secured to and extending substantially normally to one surface thereof;
   coating the surface of the base plate with a suitable adhesive;
   pressing the adhesive coated surface of the base plate into contact with the surface of the wall body, thereby adhering said member to said wall,
   pressing a first preformed foamed insulating element onto the projecting supporting element and against the base plate, causing said supporting element to penetrate the insulating member a distance less than the thickness of said insulating member,
   supporting said insulating member by means of said supporting member adjacent to said wall body surface;
   providing a second preformed foamed insulating element in like manner adjacent to and in spaced relationship to said first insulating element;
   distributing a foamable and hardenable resinous adhesive composition in a channel defined by the facing surfaces of the supported first and second insulating elements,
   said adhesive being deposited on the facing surfaces of the insulating elements and on the section of the wall body surface exposed at the bottom of the channel;
   foaming and hardening said adhesive while confined only by said channel to completely fill the channel between the insulating elements and the wall body, said adhesive forming a bond having the insulating property of the individual elements;
   permanently securing the insulating elements together and to said wall resulting in a continuous layer having an exposed face defined in a major part by the exposed surfaces of said insulating elements.

2. A method of forming a continuous insulating layer comprising:
   arranging and maintaining a plurality of preformed foamed resinous insulating elements in fixed spaced relationship to provide a space between adjacent elements, one side of said spaces being closed by a supporting body to define open-side channels;
   distributing a foamable and hardenable resinous adhesive only in said open-sided channels;
   foaming and hardening said adhesive while confined only by said channels to substantially fill said channels and adhere strongly to the adjacent surfaces of said elements to form a bond having generally the insulating property of the individual elements thereby providing
   a continuous layer having an exposed face defined primarily by the exposed surfaces of said insulating elements.

3. A method of forming a wall structure having a continuous insulating layer, comprising:
   supporting and maintaining a plurality of preformed foamed resinous insulating elements in fixed spaced relationship to each other on a surface of a rigid wall body to provide an open-sided channel between adjacent elements,
   distributing a foamable and hardenable resinous adhesive in the open-sided channels,
   foaming and hardening said adhesive while confined by the channels to substantially fill the channels and adhere strongly to the adjacent surfaces of said insulating elements and to said wall body
   thereby forming a bond having generally the insulating properties of the individual elements and providing a continuous insulating layer permanently secured to said wall body and having an exposed face defined largely by exposed surfaces of said insulating elements.

4. A continuous insulating layer comprising:
   a plurality of preformed foamed resinous insulating elements arranged and maintained in edge-to-edge fixed spaced relationship;
   said elements defining a relatively narrow space between adjacent elements;
   a foamed hardened resinous adhesive substantially filling the spaces and adhering strongly to the adjacent surfaces of said insulating elements,
   said foamed adhesive having insulating properties generally equivalent to those of the individual elements and said insulating layer having an exposed face defined primarily by exposed surfaces of the elements.

5. A wall structure having a continuous layer comprising:
   a rigid wall body,
   a plurality of preformed foamed resinous insulating elements positioned on the surface of said wall body, said elements defining a relatively narrow channel between adjacent elements;
   a foamed hardened resinous adhesive substantially filling the channels and adhering strongly to the adjacent surfaces of said insulating elements and to said wall body,
   said foamed adhesive having insulating properties generally equivalent to those of the individual elements and said insulating layer having an exposed face defined primarily by the exposed surfaces of said elements.

6. The wall structure of claim 5, wherein the preformed insulating elements are foamed resinous element having a plurality of cavities in the adjacent surfaces in contact with said foamed adhesive.

7. The wall structure of claim 5, wherein said insulating elements comprise foamed polystyrene.

8. A method of forming a continuous insulating layer comprising:
- arranging and maintaining a plurality of preformed foamed resinous insulating elements in fixed spaced relationship to provide a space between adjacent elements, one side of said spaces being closed by a supporting generally flat surfaced body to define open-side channels;
- distributing a foamable and hardenable resinous adhesive only in said open-sided channels;
- foaming and hardening said adhesive while confined only by said channels to substantially fill said channels and adhere strongly to the adjacent surfaces of said elements to form a bond having generally the insulating property of the individual elements thereby providing
- a continuous layer having an exposed face defined primarily by the exposed surfaces of said insulating elements.

9. A method of forming a wall structure having a continuous insulating layer, comprising:
- supporting and maintaining a plurality of preformed foamed resinous insulating elements in fixed spaced relationship to each other on a surface of a rigid generally flat surfaced wall body to provide an open-sided channel between adjacent elements,
- distributing a foamable and hardenable resinous adhesive in the said open-sided channels,
- foaming and hardening said adhesive while confined by the channels to substantially fill the channels and adhere strongly to the adjacent surfaces of said insulating elements and to said wall body
- thereby forming a bond having generally the insulating properties of the individual elements and providing a continuous insulating layer permanently secured to said wall body and having an exposed face defined largely by exposed surfaces of said insulating elements.

10. A continuous insulating layer which is generally flat surfaced, comprising:
- a plurality of preformed foamed resinous insulating elements arranged and maintained in edge-to-edge fixed spaced relationship;
- said elements defining a relatively narrow space between adjacent elements;
- a foamed hardened resinous adhesive substantially filling the space and adhering strongly to the adjacent surfaces of said insulating elements,
- said foamed adhesive having insulating properties generally equivalent to those of the individual elements and said insulating layer having an exposed face defined primarily by exposed surfaces of the elements.

11. A wall structure having a continuous layer comprising:
- a rigid generally flat surfaced wall body,
- a plurality of preformed foamed resinous insulating elements positioned on the surface of said wall body,
- said elements defining a relatively narrow channel between adjacent elements;
- a foamed hardened resinous adhesive substantially filling the channel and adhering strongly to the adjacent surfaces of said insulating elements and to said wall body,
- said foamed adhesive having insulating properties generally equivalent to those of the individual elements
- and said insulating layer having an exposed face defined primarily by the exposed surfaces of said elements.

12. The wall structure of claim 11, wherein the preformed insulating elements are foamed resinous elements having a plurality of cavities in the adjacent surfaces in contact with said foamed adhesive.

13. The wall structure of claim 11, wherein said insulating elements comprise foamed polystyrene.

References Cited in the file of this patent

UNITED STATES PATENTS

| | | |
|---|---|---|
| 718,214 | O'Brien | Jan. 13, 1903 |
| 744,185 | Garvey | Nov. 17, 1903 |
| 1,975,769 | Cederholm et al. | Oct. 9, 1934 |
| 2,130,743 | Parsons | Sept. 20, 1938 |
| 2,339,841 | Deuchler et al. | Jan. 25, 1944 |
| 2,389,965 | Eckel | Nov. 27, 1945 |
| 2,577,279 | Simon et al. | Dec. 4, 1951 |
| 2,578,600 | Rose | Dec. 11, 1951 |
| 2,718,829 | Seymour et al. | Sept. 27, 1955 |
| 2,730,772 | Jones | Jan. 17, 1956 |
| 2,857,931 | Lawton | Oct. 28, 1958 |
| 2,869,336 | Smidl | Jan. 20, 1959 |